W. H. SMITH.
VEHICLE SPRING CLIP.
APPLICATION FILED APR. 22, 1913.
1,097,370.
Patented May 19, 1914.
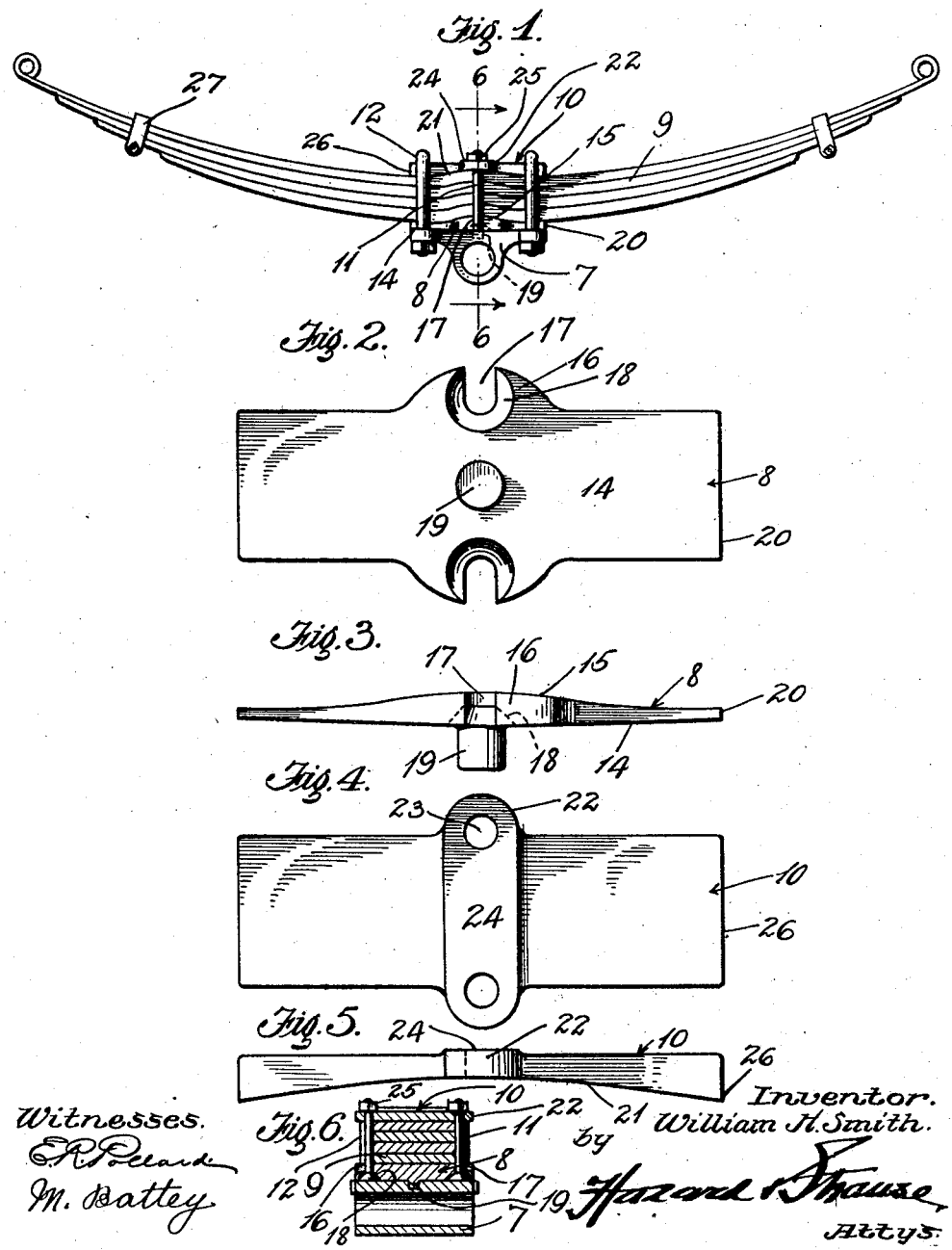
Witnesses.
E. R. Pollard
M. Batley
Inventor.
William H. Smith.
by
Howard R. Krause
Attys.

UNITED STATES PATENT OFFICE.

WILLIAM H. SMITH, OF LOS ANGELES, CALIFORNIA.

VEHICLE SPRING-CLIP.

1,097,370.  Specification of Letters Patent.  Patented May 19, 1914.

Application filed April 22, 1913. Serial No. 762,757.

*To all whom it may concern:*

Be it known that I, WILLIAM H. SMITH, a citizen of the United States, residing at Los Angeles, in the county of Los Angeles and State of California, have invented a new and useful Improvement in Vehicle Spring-Clips, of which the following is a specification.

This invention relates to vehicle spring clips, and is more especially adapted to the type for centrally humped springs instead of those provided with a bolt through their central portion, and the principal object of the invention is to provide a clip adapted to this type of spring that may be used with the axle attachments built for the ordinary flat bearing spring.

It is also an object to provide novel means for securing the bolts in relation to the lower plate of the clip together with the improved form of top plate.

In the drawings accompanying this specification and forming therewith the application for Letters Patent: Figure 1 is a side elevation of an axle block with the improved clip applied thereto supporting the humped spring. Fig. 2 is an enlarged plan view of the lower side of the bottom plate. Fig. 3 is a side elevation of this plate. Fig. 4 is a plan view, viewed from the upper side of the top plate. Fig. 5 is a side elevation of this plate. Fig. 6 is a cross section on the line 6—6 of Fig. 1, viewed in the direction indicated by the arrows.

Heretofore in the support of these humped springs, the clamping lugs have been integral with the bottom plate complicating the casting of the latter, increasing the cost of the same, and involving greater space in shipping. This invention overcomes the objections above cited, providing a cast plate of simple construction, by which means are provided to secure the heads of ordinary tie bolts, to clamp the two members securely in proper relation, and support the humped springs clamped between their sections in positive longitudinal relation.

More specifically in the drawings numerals are used to indicate the same parts in the different views, 7 designating the ordinary type of axle block provided with a flat bearing surface on which is shown supported the improved lower clamping plate 8, on which are clamped the bundle of humped springs 9, by means of the upper plate 10 and the bolts 11. The encircling clamps 12 are also shown preferably straddling both the upper plate and the lower plate and passed through the lateral openings in the top portion of the axle block 7. By passing the yoke bolts 12 entirely around and inclosing the two plates, the lateral swinging of the plates in relation to the axle block is prevented, although they may be supplied with small ears or lugs which would extend alongside the spring leaves to prevent this turning.

The lower plate is preferably an elongated casting of suitable metal having the flat lower side 14 and the humped upper surface 15, a centrally located highest portion of the hump being extended outwardly beyond the lateral sides, these lateral sides preferably conforming to the width of the spring to be supported thereon provided with the ears 16 which are preferably bifurcated or slotted from without inward at 17, the inner edge being curved to conform with the radius of the bolt adapted to be inserted in the slot. Circular bores may be preferably used in the ears, but the innermost edges of these latter must not extend inside of the width of the spring, and are so located as to cause the bolt to come in contact with the sides of the leaves composing the spring.

To provide for the head of the bolt and to secure the latter in proper position, the ears are counter-sunk as designated at 18, so that the beveled head of the ordinary tie bolt may be securely held therein, and provide a flush surface to engage with the top of the axle block 7. To insure the rigid relation of the lower plate in connection with the axle block, the lug 19 is preferably cast projecting from the lower face, a bore being centrally located in the axle block to accommodate the cylindrical lug. The upper surface 15 is so curved from the peak of the hump outwardly, that the springs will not slip thereon, and the bearing surface is sufficiently extended so that there is no tendency for the springs to break at the terminal ends 20 of the plate.

A top plate is provided of approximately the same curve on its lower spring engaging surface 21 similar to the spring engaging surface 15, it being of substantially the same length and width, and preferably provided with the ears 22 which are shown having the bores 23 which register with the slots in the plate 8 to provide means for passing the bolts 11 there-through. The upper portion of the plate is provided with the strengthening rib 24 which is extended between the ears 22, and its upper surface is horizontal to form the bearing surface for the nuts 25, threaded on the bolts 11. It has been found in practice that the upper plate is more efficient when formed of a length equal to the length of the axle block 7 so that the bolts 12, will engage the same, a flat upper surface being provided to accommodate the difference of spring of the clips, there being less tendency for the springs to slip or break at their contact with the outer ends 26 where these latter are elongated, as shown.

To prevent undue motion of the upper leaf of the spring, clamps 27 are provided securing a number of the leaves together near the end, so that the upward jump of the spring is distributed.

What I claim is:

The combination of an axle block provided with a circular centrally disposed recess on its upper face, of a plate member having a flat under face and provided with a centrally depending lug, said lug adapted to enter the circular recess in the axle block, the upper face of said member being raised in the center thereof, said member being further provided with oppositely disposed counter sunk bolt slots, said slots being formed in the sides thereof and directly opposite the lug on the under face of the plate member, a second clamping member having a flat upper face and a concaved under face and being provided on the sides thereof with bolt holes, a spring bent in the center thereof and engaging and fitting over the plate member, bolts engaging the plate and clamping member to hold the spring in rigid engagement with the axle block, and yokes fitting over the clamping member, the threaded ends of said yokes passing through apertures in the axle block and being held in rigid engagement by nuts.

In witness that I claim the foregoing I have hereunto subscribed my name this 11th day of April, 1913.

WILLIAM H. SMITH.

Witnesses:
M. F. BRENNAN,
MARIE BATTEY.